Aug. 30, 1966 E. L. BEINHAUR 3,268,991

DEVICE TO DISASSEMBLE CONNECTOR ASSEMBLIES

Filed Jan. 28, 1964

INVENTOR.
ERNEST LLOYD BEINHAUR
BY 3,268,991
DEVICE TO DISASSEMBLE CONNECTOR ASSEMBLIES
Ernest Lloyd Beinhaur, Harrisburg, Pa., assignor to Amp Incorporated, Harrisburg, Pa.
Filed Jan. 28, 1964, Ser. No. 340,737
3 Claims. (Cl. 29—203)

This invention relates to a device to break the connection between two members, such as, a wedge member in a body member.

In U.S. patent application, Serial No. 215,562, filed August 8, 1962, now Patent No. 3,212,534, there is disclosed an explosively-operated tool to drive a wedge member into a C-shaped connector body to effect an excellent mechanical and electrical connection between conductor members. Of course, other methods may be used to effect such a connection. After the connection has been effected, it sometimes becomes necessary to break the connection. Since the connection members are so tightly wedged together, it is extremely difficult to disconnect them especially if they have been connected in the manner disclosed in U.S. patent application, Serial No. 341,223, filed January 30, 1964.

It is, therefore, a primary object of the present invention to provide a device for disconnecting members that have been frictionally connected.

Another object of the present invention is the provision of a tool to disconnect frictionally connected members.

A further object of the present invention is to provide an attachment to be mounted on an existing tool to disconnect frictionally connected members.

Other objects and attainments of the present invention will become apparent to those skilled in the art upon a reading of the following detailed description when taken in conjunction with the drawing in which there are shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

In the drawings:

FIGURES 1 and 2 illustrate an attachment A which is easily inserted on flat surface FS of an explosively-operated tool member TM disclosed in U.S. patent application, Serial No. 215,562, now Patent No. 3,212,534 and Serial No. 341,223 wherein a detailed explanation of the operation thereof can be found.

Figure 1:
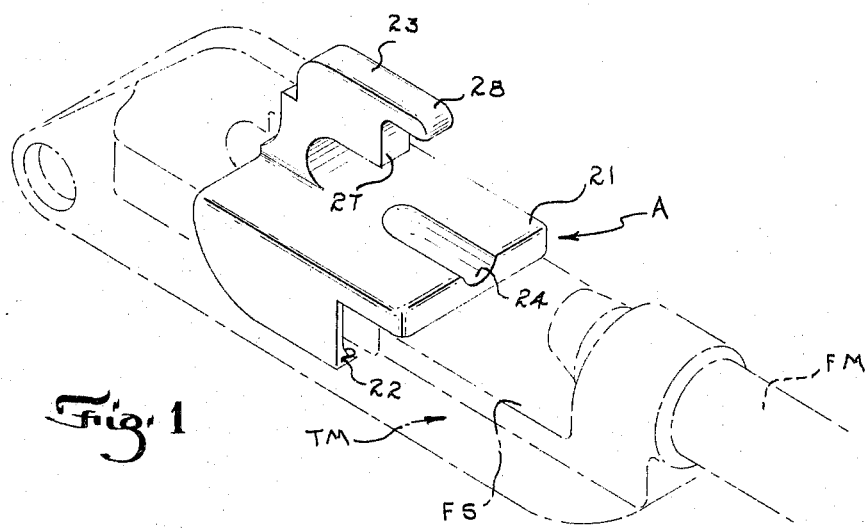
FIGURE 1 is a perspective view of an attachment with parts in phantom.

Attachment A comprises a flat section 21, legs 22 (only one of which is shown) extending outwardly from the edges of one surface of section 21 and engaging section 23 extending outwardly from the mid section of flat section 21 opposite to that of legs 22.

Flat section 21 has a groove 24 therein to allow ram R of tool member TM to pass freely across section 21. Legs 22 provide retaining means to retain the attachment on flat surface FS of the tool member.

Engaging section 23 includes a stepped portion 25 which mates with a corresponding stepped portion SP of tool member TM against which stepped portion 25 abuts to limit the movement of attachment A on the tool member and to provide an engaging area thereon when force is applied thereto. Engaging section 23 also includes another stepped portion 26 which comprises a surface 27 and a projection 28. Wedge W engages surface 27 when the connector assembly is placed within the attachment in order to disconnect the wedge from C-shaped connector body CB and projection 28 keeps wedge W from leaving surface 27 during the disconnection operation. Between engaging section 23 and flat section 21 three is a space 29 in which the connector body moves while wedge W remains in engagement with surface 27.

Figure 2:
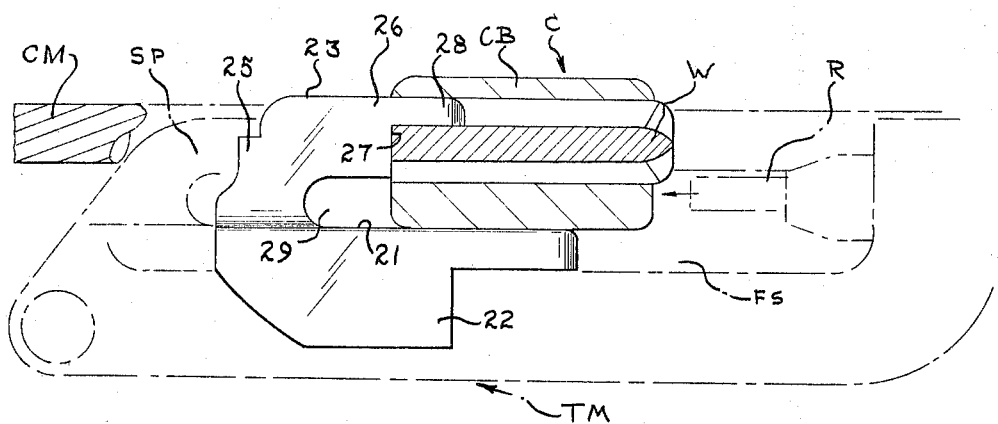
FIGURE 2 is a side elevational view of FIGURE 1.

The operation of FIGURES 1 and 2 is according to the following. Attachment A is placed on flat surfaces FS of the tool member until stepped portion SP and engaging section 23 are in engagement. A connector assembly C having wedge W frictionally engaging connector body CB to maintain conductor members CM interconnected is placed on attachment A with connector body CB on flat section 21 and wedge W engages surface 27. Firing mechanism FM is actuated and ram R thereof forcefully engages connector body CB to drive it within space 29 thereby breaking the connection between the wedge and connector body.

The embodiment of FIGURES 1 and 2 is preferably used on connections effected in U.S. patent application, Serial No. 341,223; however, it can be used on connections not using the swaged wedge.

As can be discerned, there has been disclosed novel means to disconnect connected assemblies which have been connected in such a manner to provide excellent retentive forces therebetween.

It will, therefore, be appreciated that the aforementioned and other desirable objects have been achieved; however, it should be emphasized that the particular embodiment of the invention, which is shown and described herein, is intended as merely illustrative and not as restrictive of the invention.

I claim:
1. For use on a tool having a working area including a stationary section and a movable section, an attachment for disposition in said working area comprising a flat section, retaining means on said flat section for retaining said attachment on said tool, engaging means on said flat section engaging said stationary section to limit movement of said attachment relative to said tool, said engaging means having a surface which a first element of a connection assembly engages, said surface being disposed from said flat section and defining a space therebetween which extends along said flat section, said movable section adapted to engage a second element of said connection assembly to forcefully move same into said space relative to said first element.

2. The attachment according to claim 1 wherein said engaging means includes a projection which extends along said first element to maintain same in place against said surface.

3. The attachment according to claim 1 wherein said flat section has a groove therein to allow said movable member to move freely along said flat section.

References Cited by the Examiner

UNITED STATES PATENTS

| | | | |
|---|---|---|---|
| 380,703 | 4/1888 | Snitzel | 29—268 |
| 777,006 | 12/1904 | Conard | 29—268 |
| 950,849 | 3/1910 | Hammond | 29—235 |
| 1,472,833 | 11/1923 | Herold | 29—427 |
| 1,863,897 | 6/1932 | Cloppert | 29—427 |
| 2,755,541 | 7/1956 | Kruger | 29—268 |
| 2,908,968 | 10/1959 | Oakes | 29—268 |
| 3,058,295 | 10/1962 | Temple et al. | 29—254 X |
| 3,109,233 | 11/1963 | Temple et al. | 29—254 |

WILLIAM FELDMAN, Primary Examiner.
MYRON C. KRUSE, Examiner.